United States Patent

Sinha et al.

Patent Number: 5,990,945
Date of Patent: Nov. 23, 1999

[54] ENCODED DIGITAL VIDEO TRANSMISSION SYSTEM

[75] Inventors: Atul N. Sinha, Cupertino, Calif.; Theodorus J. J. Denteneer; Serverius P. P. Pronk, both of Eindhoven, Netherlands; Hendrik G. J. Theunis, Velserbroek, Netherlands

[73] Assignee: U.S. Philips Corporation, New York, N.Y.

[21] Appl. No.: 08/920,757

[22] Filed: Aug. 29, 1997

[30] Foreign Application Priority Data

Aug. 30, 1996 [EP] European Pat. Off. .............. 96202414

[51] Int. Cl.⁶ ...................................... H04N 7/10
[52] U.S. Cl. ........................... 348/219; 348/217; 348/700
[58] Field of Search .................................... 348/700, 390, 348/385, 384, 387, 7, 845.2; 709/217–219; 370/230, 232, 235

[56] References Cited

U.S. PATENT DOCUMENTS

| | | | |
|---|---|---|---|
| 5,231,484 | 7/1993 | Gonzales et al. | 348/700 |
| 5,260,783 | 11/1993 | Dixit | 348/700 |
| 5,532,746 | 7/1996 | Chang | 348/700 |
| 5,617,150 | 4/1997 | Nam et al. | 348/700 |
| 5,819,048 | 10/1998 | Okazaki et al. | 348/7 |

FOREIGN PATENT DOCUMENTS

0517273A2  12/1992  European Pat. Off. .
0535860A2  4/1993  European Pat. Off. .

*Primary Examiner*—Victor R. Kostak
*Attorney, Agent, or Firm*—David R. Treacy

[57] ABSTRACT

Compressed digitally encoded video signals are transmitted over an asynchronous transfer mode network with varying grades of service dependent on bitrate requirements for a desired picture quality and the currently available network capacity. To maximize transmission quality and minimize cost, the grade of service requested from the network is changeable in response to scene changes.

15 Claims, 2 Drawing Sheets

ENCODED DIGITAL VIDEO TRANSMISSION SYSTEM

BACKGROUND OF THE INVENTION

The invention is related to a video transmission system comprising a transmitter with a video source for providing an encoded video signal, the transmitter comprising transmit means for transmitting the encoded video signal via a packet switched network to a receiver.

The invention is also related to a transmitter for use in such a transmission system and to a video transmission method.

A transmission system as described above is known from published European patent application No. 517 273 A2.

In order to transmit video signals in digital form, the video signal is encoded using a video encoder. Because the pictures in a video signal can have different properties, the bitrate required for encoding a video signal with a predetermined quality is not constant, but will be variable. The bitrate of an encoded video signal depends on the amount of detail in a picture and the amount of motion present in a sequence of pictures.

In view of this variable bitrate it is expected that in the near future packet switched networks will become important for the transport of variable bitrate encoded video signals. These packet switched networks will likely operate according to the ATM standard. Packet switched networks are in particular suitable for transporting user signals having a variable bitrate, because they do not build up a circuit for the complete connection, but they only pass packets from a source to a destination via a path determined at call set up. If, for instance, temporarily no packets are to be transmitted, the resources required for said transmission can be used for transmitting packets from other connections.

In order to avoid congestion in the packet switched network, at call set up the grade of service to be guaranteed by the network is defined in a so-called traffic contract negotiated between the transmitter and the packet switched network. This traffic contract enables the network to allocate resources on a statistical basis, and it poses to the transmitter the bounds within which it can operate. Elements of the connection to be negotiated between the transmitter and the network are e.g. the service categories as CBR (Constant Bit Rate), VBR (Variable Bit Rate), ABR (Available Bit Rate) and UBR (Unspecified Bit Rate ). Grade of service (GoS) parameters are e.g. CLR (Cell Loss Ratio), maxCTD (maximum Cell Transfer Delay) and peak-peakCDV (Cell Delay Variation). A problem with commonly used video encoders is that the required traffic parameters are not always available in advance. The consequence is that the grade of service requested from the network is too low, making it impossible to transmit the encoded video signal, or that the grade of service is higher than required, leading to unnecessary high cost.

In the transmission system according to the above mentioned patent application the video encoder is arranged for reducing the bitrate of the encoded video signals if this bitrate exceeds the grade of service requested from the network. This reduction of the bitrate leads to a decreased quality of the encoded pictures. The fact that sometimes the requested grade of service is higher than required, and consequently the unnecessarily high costs incurred, is accepted.

SUMMARY OF THE INVENTION

The object of the present invention is to provide a video transmission system as described in the first paragraph in which reduction of the coding quality is avoided.

Therefore the video transmission according to the invention is characterised in that the transmitter comprises scene changing indication means for providing a scene change indication, grade of service indication means for indicating a required grade of service for a scene following said scene change; and in that the transmitter comprises request means for requesting a service from the packet switched network, in response to said scene change indication, according to the required grade of service which was indicated.

The present invention is based on recognition that the required bitrate of the encoded video signal can differ substantially between scenes. By requesting a service from the network in response to a grade of service required for a new scene, the grade of service requested from the network is well adapted to the grade of service required by the encoded video signal.

An embodiment of the invention is characterised in that the request means are arranged for requesting a service being defined by at least a peak bitrate measure, an average bitrate measure, and a burstiness measure.

It has turned out that the combination of the peak bitrate, an average bitrate and a maximum size of bursts having the peak bitrate is a suitable way of representing the characteristics of an output signal of a video encoder.

A further embodiment of the invention is characterised in that the packet switched network comprises means for transmitting an acceptance message to the transmitter, the video source being arranged for providing an encoded video signal requiring a lower grade of service than the grade of service requested for, if the acceptance message indicated that the requested service cannot be provided by the packet switching network.

It can occur incidentally that the grade of service requested from the network at the beginning of a scene turns out to be insufficient during said scene. In order to keep the data transmitted to the network within the bounds of the traffic contract for said scene, the video coder is arranged for restricting its output bitrate at the expense of a small deterioration of the picture quality.

DESCRIPTION OF THE PREFERRED EMBODIMENTS

Figure 1:
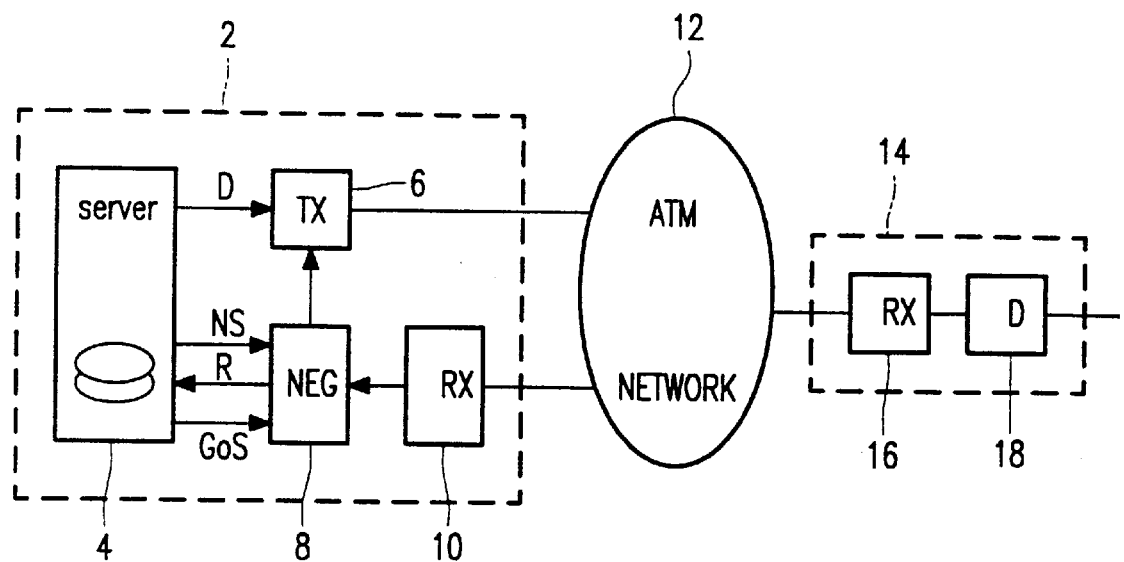
FIG. 1 is a block diagram of a video transmission system according to a first embodiment of the present invention.

In the transmission system according to FIG. 1, a first output of a video source, being here a server 4, carries an encoded video signal D. This first output of the video source is connected to a first input of the transmit means 6. A second output of the server 4, providing a scene change indication NS, is connected to a first input of the request means 8. A third output of the server 4, providing the indication GoS for the required grade of service for the next scene, is connected to a second input of the request means 8. A first output of the request means 8 is connected to a second input of the transmit means 6, and a second output of the request means 8 is connected to the server 4. The output of the transmit means 6 is connected to the ATM network 12. An output of the ATM network 12 is connected to a signalling receiver 10 in the transmitter 2. An output of the signalling receiver 10, carrying a rate indication signal R, is connected to a third input of the request means 8.

A further output of the ATM network 12 is connected to a receiver 14. In the receiver 14 the signal from the ATM network is received by a network termination 16. The output of the network termination 16 is connected to a video decoder 18. At the output of the video decoder 18 the decoded video signal is available.

In the server 4 in the transmission system according to FIG. 1, the video signal to be transmitted is stored in compressed form on the server 4. Preferably the video signal is compressed according to the MPEG-2 standard which allows a high video quality at a bitrate of 3–15 Mbit/s. The encoded video signal is applied to the transmission means 6 for transmission via the ATM network 12.

Each time a new scene is started, a signal NS, together with a signal GoS is passed from the server 4 to the request means 8. The signals NS and GoS are stored synchronously with the encoded video signal on the server 4. Consequently the signal NS indicates a scene change in the video signal represented by the encoded video signal, and the signal GoS indicates the grade of service required for the next scene. According to the inventive concept of the present invention, the request means 8 tries to negotiate a new traffic contract with the ATM network according to the required grade of service indicated by the signal GoS. The ITU-T B-ISDN standard Q.2931 includes the possibility of modifying the bandwidth traffic descriptors (PCR, SCR and MBS) during a single connection. The negotiation process can be executed in two ways.

The first possibility is that the request means 8 submit via the transmitter 6 a request for a grade of service defined by the signal GoS to the network, and the network responds via the receiver 10 with a message whether or not the requested grade of service can be provided. If the requested grade of service cannot be provided, the previously negotiated traffic contract remains valid, and the request means 8 submit a signal R to the server 4 to indicate that the server 4 must keep its output within the bounds of the previously negotiated traffic contract.

A second possibility is that the request means 8 submit via the transmitter 6 a request for a grade of service defined by the signal GoS to the network, and the network responds with a message that the requested grade of service can be provided, or it presents the grade of service it can offer. In the latter case, the request means 8 signals back to the ATM network whether it accepts the offer from the network or not.

The ATM network 12 delivers the data from the transmitter 2 to a subscriber 14. The data from the ATM network 12 is received by the network termination 16 and passed to the video decoder 18. At the output of the video decoder 18, the decoded video signal is available.

Figure 2:
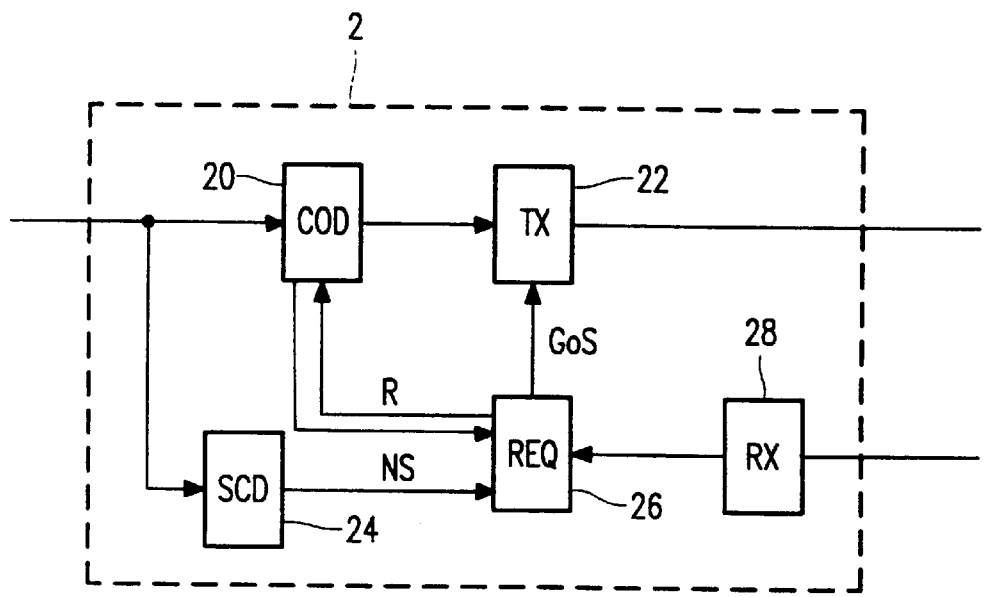
FIG. 2 is a block diagram of a transmitter to be used in a video transmission system according to a second embodiment of the present invention.

In the transmitter according to FIG. 2, an uncoded video signal is applied to an input of a video source 20, and to an input of a scene change detector 24. A first output of the video source 20 is connected to an input of the transmit means 22. A second output of the video source 20 is connected to a first input of the request means 26. An output of the scene change detector 24 is connected to a second input of the request means 26. A first output of the request means 26 is connected to the video source 20. A second output of the request means 26 is connected to a second input of the transmit means 22. The output of the transmit means 22 constitutes the output of the transmitter 2. An input of the transmitter is connected to a receiver 28. The output of the receiver 28 is connected to a third input of the request means 26.

The video source 20 is arranged for real time encoding of the uncoded video signal at its input. The encoded video signal D is presented to the transmit means 22 for transmission to the ATM network. The scene detector 24 derives from the uncoded video signal a signal NS indicating the start of a new scene. Several methods are available to detect the start of a new scene. A first method for detecting scene changes is comparing two subsequent pictures, by subtracting the pixel value pixel by pixel and summing the pixel differences over the complete picture. For the difference measure e between two pictures equation (1) can be written:

$$e = \sum_{i=1}^{N} \sum_{j=1}^{M} |p_1[i,j] - p_2[i,j]| \quad (1)$$

In (1) $P_1[i,j]$ represents the pixel values of the first picture, and $P_2[i,j]$ represents the pixel values of the second picture. M is the number of pixels in one line, and N is the number of lines in a picture. If the value e exceeds a predetermined threshold the presence of a scene change is signalled.

A second method for detecting scene changes is to generate a histogram of the value of the luminance of two subsequent pictures. In said histograms the number of occurences of a predetermined luminance value is stored as function of said luminance value. In the case of a scene change the histograms of two subsequent picture will differ significantly. For the difference measure d between subsequent histograms equation (2) can be written:

$$d = \sum_{i=1}^{P} |H_1[i] - H_2[i]| \quad (2)$$

In (2) $H_1[i]$ represents the histogram of the first picture, and $H_1[i]$ represents the histogram of the second picture. P is the number of bins in the histogram. A scene change is regarded to be present if the measue d exceeds a predetermined threshold value. An advantage of the method using the histograms, is the reduced influence of differences between the two pictures due to movement, because a changed position of an element in the pictures affects the difference value e according to (1), but said movement has no influence at all on the histogram. Methods of detecting scene changes are extensively discussed in the paper "Adaptive Frame Type Selection for Low Bit-Rate Video Coding" by J. Lee and B. W. Dickinson, in SPIE Vol. 2308 pp. 1411–1421, 1994.

If a scene change is present, the request means 26 read an estimate GoS of the required grade of service for the next scene from the video source 20. The request means 26 submit a request for a traffic contract according to the grade of service required by the video source 20 to the ATM network. If the request is accepted, the video encoder can transmit according to the new traffic contract. If the request is denied, the request means 26 submit a signal R to the video source 20 to indicate that the video encoder must restrict its output according to the previously negotiated service contract. If the network proposes a grade of service between the actual grade of service and the requested grade of service, the request device informs the video source 20 about the parameters of the new service contract.

The grade of service requested by the transmitter heavily depends on the type of application. In case of a live video transmission the required grade of service is higher than the required grade of service for a video transmission that is intended to be recorded on a digital video recorder for later use. A first choice that has to be made is the type of connection to be used. In the table below the different service categories are listed together with the GoS parameters which can be requested from the network.

| Service category | Parameters |
|---|---|
| Constant Bit Rate (CBR) | Peak Cell Rate (PCR) |
|  | Cell Loss Ratio (CLR) |
|  | maximum Cell Transfer Delay (maxCTD) |
|  | peak-peak Cell Delay Variation (p-pCDV) |
| Variable Bit Rate (VBR) | Peak Cell Rate (PCR) |
|  | Sustainable Cell Rate (SCR) |
|  | Maximum Burst Size (MBS) |
|  | Cell Loss Ratio (CLR) |
|  | maximum Cell Transfer Delay (maxCTD) |
|  | peak-peak Cell Delay Variation (p-pCDV) |

In the case a CBR connection is requested, the only traffic descriptor to be specified is the PCR value. This value has to be determined from the bitrate from the video source 20. The unit of transport can be a picture, but in an MPEG video coder the unit of transport can be a Group Of Pictures (GOP). In MPEG coding different types of coded pictures are present. There are so-called I pictures which are encoded without using information from neighbouring pictures. There are also so-called B and P pictures which are encoded using information from neighbouring pictures. In the coding of B pictures information from the previous and the following pictures is used. In the coding of P pictures only information from the previous picture is used. A group of pictures between two I pictures including 1 I picture is called Group Of Pictures. Normally the encoding of an I picture requires the largest bitrate. It is observed that the scene change detector informs the encoder of a scene change, in order to have it to start a new GOP.

If the unit of transport is a picture, a PCR required for the largest I picture of a scene has to be requested from the network. If the unit of transport is a GOP, a PCR required for the largest Group of Pictures of a scene has to be requested from the network. The PCR required with a GOP as unit of transfer is, for typical film material, about half the PCR required with a picture as unit of transfer.

In the case a VBR service is requested from the network, the traffic descriptors to be specified are PCR, SCR and MBS. There is a relation between PCR, SCR, MBS and the size L of a (virtual) buffer memory that is read in with the actual bitrate, and is read out with a constant rate SCR without overflowing. This relation is given by:

$$MBS = 1 + \frac{L}{1 - \frac{SCR}{PCR}} \quad (3)$$

For the size L of the buffer as function of PCR, SCR and MBS can be written:

$$L = \left(1 - \frac{SCR}{PCR}\right) \cdot (MBS - 1) \quad (4)$$

From (4) it is clear that L is large in case PCR is much larger than SCR, and that L is small if PCR is substantially equal to SCR. Because L is a measure for the size of buffer memories required in the network, a larger value of L will result in higher costs for the subscriber. A larger PCR will also result in higher costs for the subscriber. The subscriber equipment can be arranged for selecting a suitable values of SCR, PCR and MBS to minimize the cost incurred.

Figure 3:
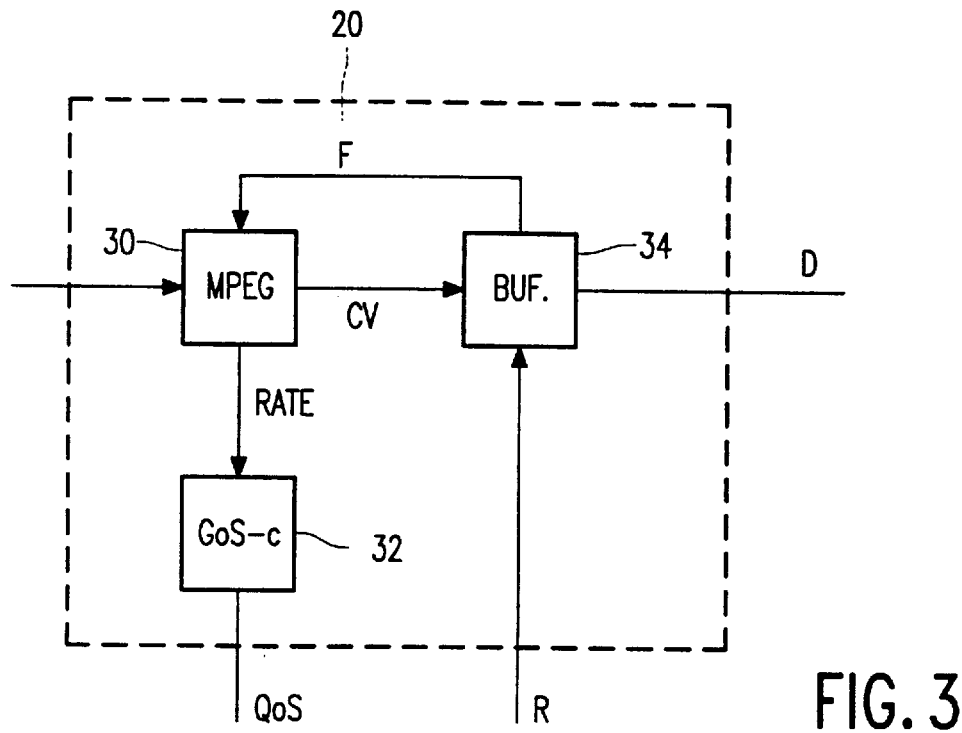
FIG. 3 is a block diagram of an embodiment of the video encoder to be used in the transmission system according to FIG. 2.

In the video source 20 according to FIG. 3, the input is connected to an MPEG video encoder 30. A first output of the MPEG video encoder 30, carrying an output signal CV, is connected to the input of a buffer memory 34. A second output of the MPEG video encoder 30, carrying an output signal RATE, is connected to an input of the grade of service estimation means 32. The output of the grade of service estimation means 32 provides an output signal GoS of the required grade of service. A first output of the buffer memory 34, carrying an output signal D, constitutes the output signal of the video source 20. A second output of the buffer memory 34, carrying an output signal F, is connected to a control input of the MPEG video encoder 30. An input signal R is applied to a second input of the buffer memory 34.

In the video encoder 30, the input video signal is encoded according to the well known MPEG-2 coding standard. The coded video signal CV at the output of the MPEG 2 video encoder 30 is temporarily stored in the buffer memory 34. The coded video signal is read out from the buffer memory with a bitrate determined by the rate signal R. It is assubed that this bitrate is constant during one scene. A CBR traffic contract per scene is assumed. The rate R is determined by the request means 26 in response to the grade of service that can be offered by the ATM network 12. The signal F indicates the filling rate of the buffer memory 34, and is used by the MPEG video encoder 30 to reduce its output rate if the buffer memory tends to overflow. The MPEG video encoder 30 can reduce its output rate by reducing the number of quantisation levels used for quantising the so called DCT (Discrete Cosine Transform) coefficients used in the encoding process.

Figure 4:
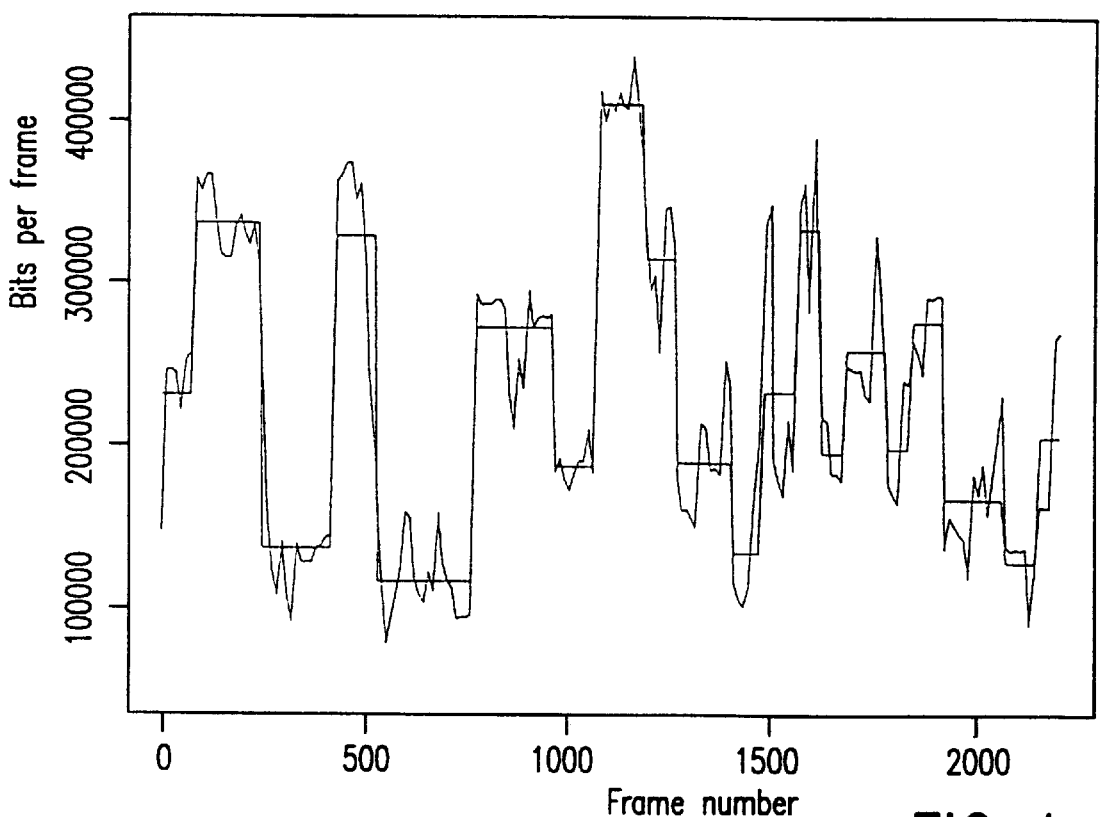
FIG. 4 is a graph representing the required bitrate per frame as function of time for typical film material.

The graph in FIG. 4 shows the required number of bits per frame of typical film material. From FIG. 4 it can clearly be seen that the required bitrate varies strongly from scene to scene. In the tables below the traffic descriptors for an MPEG 2 (non-scalable, main profile, mai level) encoded part of 30 minutes from the film "Four Weddings and a Funeral" is presented. These traffic descriptors are given for a transmission system according to the prior art in which the grade of service is negotiated only at the beginning of the connection, and for a transmission system according to the present invention in which the grade of service is renegotiated at scene changes).

|  | Service | Traffic | Picture mean | Picture max | GOP mean | GOP max |
|---|---|---|---|---|---|---|
| prior art | CBR | PCR (Cells/sec) | 31500 | 31500 | 16800 | 16800 |
|  | VBR | PCR (Cells/sec) | 31500 | 31500 | 16800 | 16800 |
|  |  | SCR (Cells/sec) | 7538 | 7538 | 7538 | 7538 |

| | Service | Traffic | Picture mean | Picture max | GOP mean | GOP max |
|---|---|---|---|---|---|---|
| invention | CBR | MBS (Cells) | 683712 | 683712 | 973629 | 973629 |
| | | PCR (Cells/sec) | 18520 | 31500 | 8981 | 16800 |
| | | PCR (Cells/sec) | 18520 | 31500 | 8981 | 16800 |
| | VBR | SCR (Cells/sec) | 7336 | 13090 | 7336 | 13090 |
| | | MBS (Cells) | 4067 | 34020 | 11470 | 83410 |

From the table it can be seen clearly that in the case of a prior art transmission system a much higher grade of service has to be requested from the network, than in a transmission system in which the invention is used. In particular the large values of MBS in case of the prior art system lead to very large buffers in the network.

In the CBR case, the value of L is 520098 for picture based transmission, and 536770 for GOP based transmission for a transmission system according to the prior art. For a system according to the invention, the maximum value of L is 27000 and the average value of L is 2500, both for picture and GOP based transmission.

We claim:

1. A video transmission system comprising a transmitter and a packet switched network, the transmitter comprising a video source for providing an encoded video signal, and transmitting means for transmitting said encoded video signal over the packet switched network, characterized in that the transmitter further comprises:

indication means for providing an indication of scene change, requirement means for indicating a required grade of service for a scene following said scene change, and request means for requesting a service from the packet switched network according to said required grade of service in response to said indication of scene change, prior to transmission of said scene following said scene change.

2. A system as claimed in claim 1, characterized in that:
   the packet switched network comprises means for transmitting an acceptance message to the transmitter, and
   said video source is arranged to provide, in response to receipt of an acceptance message which indicates that a requested service cannot be provided by the packet switching network, an encoded video signal requiring a lower grade of service than said requested service.

3. A system as claimed in claim 1, characterized in that the request means request a service defined by at least a peak bitrate measure, an average bitrate measure, and a burstiness measure.

4. A system as claimed in claim 3, characterized in that:
   the packet switched network comprises means for transmitting an acceptance message to the transmitter, and
   said video source is arranged to provide, in response to receipt of an acceptance message which indicates that a requested service cannot be provided by the packet switching network, an encoded video signal requiring a lower grade of service than said requested service.

5. A transmitter for a video transmission system, in which system encoded video signals are carried over a packet switched network,
   said transmitter comprising a video source for providing an encoded video signal, and transmitting means for transmitting said encoded video signal to the packet switched network, characterized in that the transmitter further comprises:

indication means for providing an indication of scene change, requirement means for indicating a required grade of service for a scene following said scene change, and request means for requesting a service from the packet switched network according to said required grade of service in response to said indication of scene change, prior to transmission of said scene following said scene change.

6. A transmitter as claimed in claim 5, characterized in that:
   the transmitter comprises means for receiving an acceptance message from the packet switched network, and
   said video source is arranged to provide, in response to receipt of an acceptance message which indicates that a requested service cannot be provided by the packet switching network, an encoded video signal requiring a lower grade of service than said requested service.

7. A transmitter as claimed in claim 5, characterized in that the request means request a service defined by at least a peak bitrate measure, an average bitrate measure, and a burstiness measure.

8. A transmitter as claimed in claim 7, characterized in that:
   the transmitter comprises means for receiving an acceptance message from the packet switched network, and
   said video source is arranged to provide, in response to receipt of an acceptance message which indicates that a requested service cannot be provided by the packet switching network, an encoded video signal requiring a lower grade of service than said requested service.

9. A transmitter as claimed in claim 5, characterized in that said video source has an input to which an uncoded video signal is applied, and said indication means has an input to which said uncoded video signal is applied.

10. A transmitter as claimed in claim 9, characterized in that said requirement means includes said requirement means, and said request means has first, second and third inputs,
    said first input receives an output from said video source,
    said second input receives an output from said indication means, and
    said third input receives an output from said means for receiving.

11. A transmitter as claimed in claim 10, characterized in that said request means has a first output connected to said transmitting means for transmitting a request for service, and a second output connected to said video source to indicate parameters of a grade of service to be provided by the packet switched network which is lower than the requested service.

12. A video transmission method comprising encoding an uncoded video signal, and transmitting said encoded video signal via a packet switched network to a receiver, characterized in that the method further comprises:
    providing an indication of scene change, indicating a required grade of service for a scene following said scene change, and requesting a service from the packet switched network according to said required grade of service in response to said indication of scene change, prior to transmission of said scene following said scene change.

13. A method as claimed in claim 12, further comprising:

transmitting an acceptance message from the packet switched network to the transmitter, in response to receipt by the network of request for said required grade of service, and in response to receipt of an acceptance message which indicates that a requested service cannot be provided by the packet switching network, encoding said uncoded video signal into an encoded video signal requiring a lower grade of service than said requested service.

14. A method as claimed in claim 12, characterized in that the step of requesting a service comprises requesting a service defined by at least a peak bitrate measure, an average bitrate measure, and a burstiness measure.

15. A method as claimed in claim 14, further comprising:

transmitting an acceptance message from the packet switched network to the transmitter, in response to receipt by the network of request for said required grade of service, and in response to receipt of an acceptance message which indicates that a requested service cannot be provided by the packet switching network, encoding said uncoded video signal into an encoded video signal requiring a lower grade of service than said requested service.

* * * * *